United States Patent [19]

Chenausky et al.

[11] 4,449,220
[45] May 15, 1984

[54] APPARATUS AND METHOD FOR DEPOSITION OF ELECTRICAL POWER IN AN ELECTRIC DISCHARGE LASER

[75] Inventors: Peter P. Chenausky; Robert H. Bullis, both of Avon; Clyde O. Brown, Newington, all of Conn.; Ernest B. Manning, deceased, late of Bolton, Conn., by Anne M. Manning, heir

[73] Assignee: United Technologies Corporation, Hartford, Conn.

[21] Appl. No.: 864,961

[22] Filed: Dec. 27, 1977

[51] Int. Cl.³ .............................................. H01S 3/097
[52] U.S. Cl. ................................ 372/83; 313/231.61; 372/86; 372/87
[58] Field of Search .............. 331/94.5 PE, 94.5 G, 331/94.5 D; 330/4.3; 313/231.3, 231.4, 231.6, 231.61; 372/81, 83, 86, 87, 88, 58, 38, 35

[56] References Cited

U.S. PATENT DOCUMENTS

| | | | |
|---|---|---|---|
| 3,641,457 | 2/1972 | Brown et al. | 331/94.5 G |
| 3,743,963 | 7/1973 | Bullis et al. | 331/94.5 G |
| 3,772,610 | 11/1973 | Foster et al. | 331/94.5 G |
| 3,781,712 | 12/1973 | Judd | 331/94.5 G |
| 3,886,479 | 5/1975 | Pearson | 331/94.5 PE |
| 4,016,448 | 4/1977 | Nighan et al. | 331/94.5 PE X |
| 4,077,018 | 2/1978 | Fahlen et al. | 331/94.5 PE |
| 4,145,669 | 3/1979 | Babcock | 331/94.5 PE |

OTHER PUBLICATIONS

O. Judd et al., "Investigations of a UV Preionized Electrical Discharge and $CO_2$ Laser", IEEE Journal of Quantum Electronics, vol. QE-10, No. 1, Jan. 1974, pp. 12-20.

S. A. Wutzke et al., "CW Pin Discharge Laser", Westinghouse Research Laboratories Report, Final Technical Report, Nov. 30, 1974.

K. A. Laurie et al., "A Pin-Electrode Atmospheric-Pressure $CO_2$ Laser", IEEE Journal of Quantum Electronics, QE-7, Dec. 1971, pp. 530-531.

Primary Examiner—James W. Davie
Attorney, Agent, or Firm—Dominic J. Chiantera

[57] ABSTRACT

An improved electrode configuration and method for the deposition of electrical energy into an electric discharge laser having a gas path transversely disposed to an optical axis and the electric field is disclosed. The electrode configuration includes a cathode, having a row of preionization electrodes with each preionization electrode typically having the configuration of a pin and power electrodes positioned downstream of and in a parallel relationship to the row of preionization electrodes wherein the power electrodes typically have a configuration of a rod, and a planar anode disposed opposite the cathode in a parallel relationship thereto, wherein the cathode and the anode define the gas path therebetween. The electrode configuration is adapted for operation without ballast resistance in the electrical circuit of the power electrodes for high electrical power deposition with high efficiency into a gas having a high pressure and a high flow rate for convective cooling to obtain a laser beam having high power. The electrode configuration provides a discharge having substantially diffuse and uniform characteristics within the discharge region.

22 Claims, 4 Drawing Figures

| KEY | CURRENT AMP |
|---|---|
| ○ | 1.1 |
| × | 4.4 |
| △ | 9.9 |
| □ | 10.5 |

APPARATUS AND METHOD FOR DEPOSITION OF ELECTRICAL POWER IN AN ELECTRIC DISCHARGE LASER

BACKGROUND OF THE INVENTION

This invention relates to electric discharge lasers and more particularly to an improved discharge configuration adapted for use with electric discharge lasers having a transverse flowing gas medium.

Electric discharge lasers having a flowing gas gain medium are well known in the art. The basic motivation for employing a flowing gas gain medium for convective cooling of the laser discharge gases, especially for molecular discharge systems, and the benefits derived therefrom, such as enhanced laser performance, are taught by Brown et al in U.S. Pat. No. 3,641,457 filed Sept. 10, 1969 and held with the present application by a common assignee. Brown et al discloses the importance of maintaining the proper ratio of the electric field to the neutral gas density in the laser discharge to maximize energy transfer from the discharge electrons to the upper energy level of the lasing gas. Furthermore, the optical power output of a molecular discharge laser is proportional to the difference between the population densities of the upper energy level and the low energy level of the lasing gas. As is disclosed by Brown et al, the population density of the upper energy level is directly enhanced by operating at pressures exceeding several torr, with greater enhancements being achieved as the pressure approaches atmospheric. By employing a flowing gas gain medium to convectively cool the discharge gases, the population density of the lower energy level is reduced which favorably influences laser performance.

While these basic principles influencing electric discharge laser performances have been demonstrated in a geometry in which the directions of the flowing gas, the electric field, and the optical axis are mutually coaxial, the resulting total system size and weight is not optimum. This occurs primarily because of the high pressure drop along the flow path, typically on the order of several meters, of the gas through the laser cavity. Pressure drop considerations in overall laser system design, especially when a closed cycle recirculating gas loop is employed, significantly impact the recirculating pump size, and therefore, overall laser system size, weight and cost. These considerations in many applications have lead to the development of alternate laser discharge and cavity geometries.

One configuration which is well known in the art is the electron beam stabilized transverse laser geometry. In this configuration, the flow direction, the discharge electric field direction, and the optical axis are mutually perpendicular. Typically, the discharge dimension both in the flow direction and transverse to both the flow direction and optical axis is short in comparison to the total optical path length. This results in a requirement for having discharge electrodes having large extended areas. To provide a uniform discharge over the extended area of the electrode at high pressures and to prevent the flow field from convecting the discharge out of the laser cavity in the downstream flow direction, a high energy electron beam is employed to produce a low level of ionization of the gas uniformly throughout the laser discharge region. At high pressures (greater than fifty torr), the low level of ionization provided by the electron beam delays the onset of discharge instabilities which cause the desired diffuse discharge to collapse catastrophically into an arc.

As is well known in the art, arc formation destroys the laser output because the entire uniformly distributed diffuse electron current flow of the discharge is concentrated into the very small region of the arc in which the electric field to neutral gas density ratio is no longer maintained at the proper level for optimum population of the upper energy level of the laser gas. In addition, significant gas heating in the arc channel occurs which increases the lower energy level population, further destroying laser performance.

A transverse discharge configuration has virtually no blockage in the flow field due to discharge electrodes and/or optical elements and the discharge dimension in the flow direction is short, on the order of ten to twenty centimeters. Accordingly, the pressure drop across the laser cavity at high flow velocities is minimized. Also, in a transverse discharge configuration, the combined high flow velocity and short discharge length in the flow direction reduces gas residence time within the discharge. As taught by Nighan et al in U.S. Pat. No. 4,106,448 filed Nov. 26, 1975 and held with the present application by a common assignee, there is an inverse relationship between the maximum power density that can be deposited into the laser discharge before the onset of arc formation and the time the gas remains in the discharge region. Therefore, the transverse laser discharge configuration in addition to offering the potential for low pressure drop operation also offers the potential capability of extending to higher levels the maximum power density that can be deposited into the discharge prior to the onset of arcing.

Indeed, quite impressive laser performance has been achieved with transverse gas discharge laser systems employing high energy electron beam stabilization of the discharge. However, the use of a high energy electron beam represents a significant addition to the total number of laser system components, and increases the operational complexity and total laser system cost. For many laser applications these additions are prohibitive. As a consequence, alternate methods for the stabilization of the discharge are desired for systems having the discharge transverse to the path of the gas flow. A transverse discharge configuration in which both the discharge electric field and optical axis are transverse to the flow path of the gas is disclosed by Bullis et al in U.S. Pat. No. 3,743,963 filed Sept. 10, 1969 and held with the present application by a common assignee, in which the discharge has been stabilized through the use of Radio Frequency (RF) auxiliary ionization techniques. This approach, which is similar in nature to electron beam stabilization, utilizes a RF source to produce a weakly ionized uniform plasma in the discharge region. The weakly ionized plasma results in a uniform diffuse glow discharge across discharge electrodes having an extended area and stabilizes the discharge against flow field effects which normally would sweep the discharge downstream in the flow direction. While RF discharge stabilization represents a reduction in laser system complexity and cost, compared to electron beam stabilization, additional system components are still required with this approach.

One method to eliminate the additional complexities represented by the use of either electron beam or RF discharge stabilization is disclosed by Foster et al in U.S. Pat. No. 3,772,610 filed on Sept. 20, 1971 which teachs the use of an extended length transverse discharge configuration in which the discharge is allowed to be swept downstream by the convective forces of the flow field. In this configuration, an elongated cylindrical tubular cathode is disposed within the gas stream transverse to the gas path and upstream of a segmented anode disposed flush within a channel wall. The single tubular cathode produces turbulence in the region immediately adjacent to the downstream side of the cathode surface to provide a homogeneous gaseous medium for the purpose of enhancing discharge stabilization. A single pin electrode disposed proximate to the upstream side of the tubular cathode provides startup ionization in the gas between the pin and the cathode. Ballast resistance is employed on each of the flush mounted segmented anode elements for discharge stabilization. While this configuration attempts to take advantage of the benefits to be derived from transverse discharge operation, failure to stabilize the discharge against convective flow of the gases results in only a limited range of conditions over which the discharge can be successfully operated. Specifically, because of the forces within the convective flow, discharge operation, as taught by Foster et al, is limited to pressures of approximately 35 torr and gas flow velocities of approximately 30 meters per second. A second limit, which also determines the maximum operation pressure and velocity levels, is the requirement in this configuration to produce a uniform discharge over the elongated tubular cathode without the use of auxiliary ionization for discharge stabilization. Further, because the maximum operating gas flow velocities are considerably lower than those achievable with other transverse discharge configurations, the gas residence time is significantly longer which limits the maximum attainable discharge power density before the onset of discharge arcing.

At the May, 1975 IEEE/OSA Conference on Laser Engineering and Application, Wutzke et al disclosed a pin-to-plane transverse gas discharge laser geometry in which significant improvements in discharge performance were achieved over the Foster et al configuration. In the pin-to-plane transverse discharge geometry, the cathode structure, consisting of an array of small diameter pins located on one centimeter centers in several rows along the flow direction is disposed opposite to a planar anode and transverse to the gas path. To stabilize the discharge, each cathode pin is individually ballasted with fifty thousand ohms of resistance. This discharge configuration is capable of producing a stable discharge at pressures of 140 torr and discharge power densities up to 50 w/cm$^3$. This performance represents approximately a factor of four increase in discharge operating pressure and approximately a factor of ten increase in discharge power density achievable over that reported by Foster et al. Furthermore, these increases were achieved at flow velocities of 150 m/sec which permits enhanced convective cooling of the discharge while also minimizing residence time of the discharge gas.

The discharge geometry disclosed by Wutzke et al has several system drawbacks. The requirement to provide individual ballasting of fifty thousand ohms to each of the multiplicity of cathode pins results in a complex and costly cathode structure. Further, because of the magnitude of the ballast required, a significant amount of power is dissipated in the resistive ballast. This obviously impacts unfavorably on overall system efficiency. In addition, the discharge produced by the pin cathode configuration yields a highly concentrated plasma region adjacent to the pin. This results in relatively nonuniform discharge excitation along the optical axis and the regions immediately adjacent to the pin cathodes have discharge power densities approximately of an order of magnitude higher than the average for the whole discharge. As a consequence, the limiting power density prior to the onset of discharge arcing is determined by the power density in these localized regions rather than the average power level deposited in the total discharge. Because of this factor the average discharge power density is limited to levels significantly below those that would be determined by gas discharge residence time considerations.

SUMMARY OF THE INVENTION

An object of the present invention is to provide an improved transverse laser discharge capable of sustaining a substantially uniform discharge medium.

A further object of this invention is to provide a uniform discharge medium with simplified discharge elements.

According to the present invention an apparatus for the deposition of electrical power in a direction transverse to a path of flowing gas to provide a substantially diffuse plasma comprises, a cathode including at least one row of preionization electrodes disposed transverse to and extending into the path of the flowing gas and at least one power electrode disposed downstream of the row of preionization electrodes and extending into the path of the flowing gas and an anode having a configuration of a plane disposed opposite the cathode in a spaced apart and parallel relation thereto with the path of the flowing gas disposed therebetween. In an electric discharge laser, the present invention further includes means for providing a first electric potential between the preionization electrodes and the anode to ionize the gas flowing therebetween, means for providing a second electric potential between the power electrode and the anode to generate a substantially diffuse discharge in the gas flowing therebetween, an optical cavity transversely disposed to the path of the flowing gas between the cathode and the anode, and means for coupling out a beam of electromagnetic radiation from the cavity.

A feature of the present invention is the preionization electrode with a configuration of a pin having a small diameter with one end extending into the path of the flowing gas. Additionally, the power electrode has the configuration of a rod having a longitudinal axis disposed transverse to the path of the flowing gas and substantially parallel to and downstream of the row of preionization electrodes. Also, each row of preionization electrodes has a separate voltage source for controlling the electrical power deposition into the gas. In addition, each preionization electrode is ballasted for stabilization of the preionization discharge. A preferred embodiment of the present invention includes at least two rows of pins with the pins in each row positioned in a staggered relationship with the pins in an adjacent row. Additionally, the preferred embodiment includes at least two rows of rods disposed parallel to and downstream of the rows of pins. The rods are unballasted. The preionization electrodes are mounted in a cathode holder formed of electrical insulation material having a sufficient dielectric strength to avoid shorting between elements. In one embodiment, the rods are hollow to enable coolant to pass therethrough to remove heat generated within the rods during operation. Additionally, each rod has a separate voltage source for controlling the electrical power deposition into the discharge. The pins at the beginning and end of each row are positioned within the cathode holder a sufficient distance from the ends of the cathode holder to preclude the formation of an ionization path between the pins and the supports for the rods located near the ends of the cathode holder. The anode, having a planar configuration, is disposed opposite the cathode holder and combined with the cathode holder defines a gas path channel therebetween. In a laser, the pin-rod-planar electrode configuration supplies an electric field transverse to an optical axis of the apparatus and transverse to the path of the gas flow. As least sixty percent of the electrical power deposition into the discharge passes through the unballasted power electrodes with the remaining portion passing through the ballasted preionization electrodes. In the preferred embodiment, the cathode electrodes are constructed with refractory metals or other suitable high temperature meals. The pin-rod-planar electrode configuration is adapted for continuous electrical power deposition into a gas stream having high pressure and high flow rates transverse to the electrical power deposition.

A primary advantage of the present invention is the high electrical power density deposition into the gas stream without complex and costly discharge stabilization elements. Additionally, the utilization of unballasted power electrodes significantly increases the fractional amount of the total electrical power deposition into the gas. Also, the continuous electrical power deposition into the gas yields a high degree of discharge uniformity which significantly increases the level of the average discharge power density deposition into the gas before the onset of discharge arcing. Additionally, the ability to independently adjust the potential applied to each power electrode and the relative electrode spacing allows the gain profile in discharge in the transverse flow direction to be tailored for optimum optical coupling. Additionally, the high electrical field concentration about the preionization electrodes permit maintaining a stable discharge in a gas having high pressure and high flow rate.

The foregoing and other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
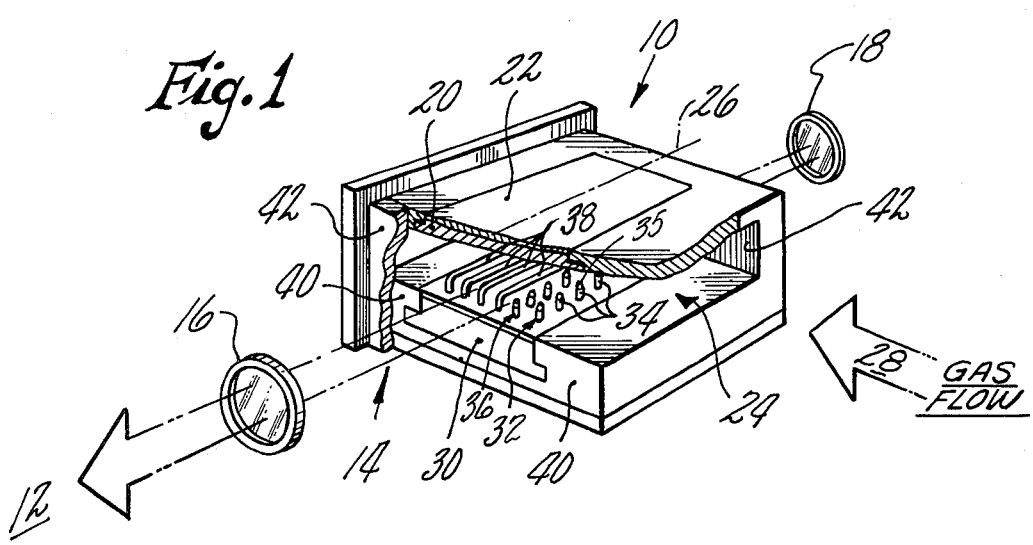
FIG. 1 shows a simplified perspective view of an electrode configuration in accordance with the present invention.

FIG. 1 shows a simplified perspective view of the present invention wherein an electrode configuration 10 is shown positioned about an optical axis 12 of a laser cavity 14 defined at one end by a first mirror 16 and at the other end by a second mirror 18. An anode 20 positioned within an anode holder 22 defines a first side of a gas path channel 24. The anode has a longitudinal axis 26 transversely disposed to a gas path 28. A cathode holder 30 defining a second side of the gas path channel 24, opposite the first side, contains a first row 32 of preionization electrodes 34, such as pins, positioned on the upstream side of the cathode holder, a second row 36 of preionization electrodes positioned downstream of the first row 32 of preionization electrodes and four rows of power electrodes 38, such as rods, located downstream of and parallel to the rows of preionization electrodes wherein the preionization electrodes and the power electrodes form a cathode. The power electrodes have a spaced apart relationship to one another and to the preionization electrodes, having a parallel relationship to the anode 20, and extend into the gas path channel 24. The individual preionization electrodes 34 in the first row 32 are positioned in a staggered relationship to the individual preionization electrodes 34 in the second rod 36. The anode holder 22 and the cathode holder 30 are attached to end plates 40 which cooperate with side walls 42 to define the gas path channel 24. The first and second mirrors 16, 18, respectively, are mounted along the optical axis 12 and are in line of sight optical communication with one another through openings (not shown) within the side walls 42.

Figure 2:
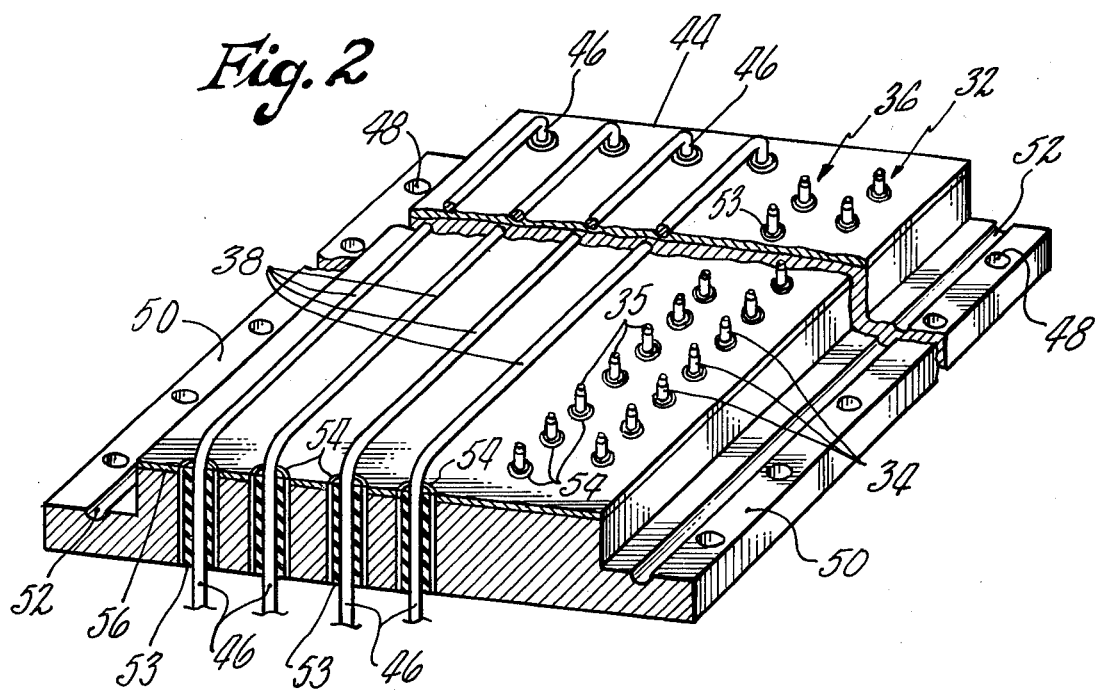
FIG. 2 is a simplified view of the cathode of the electrode configuration as shown in FIG. 1 having preionization and power electrodes.
Figure 3:
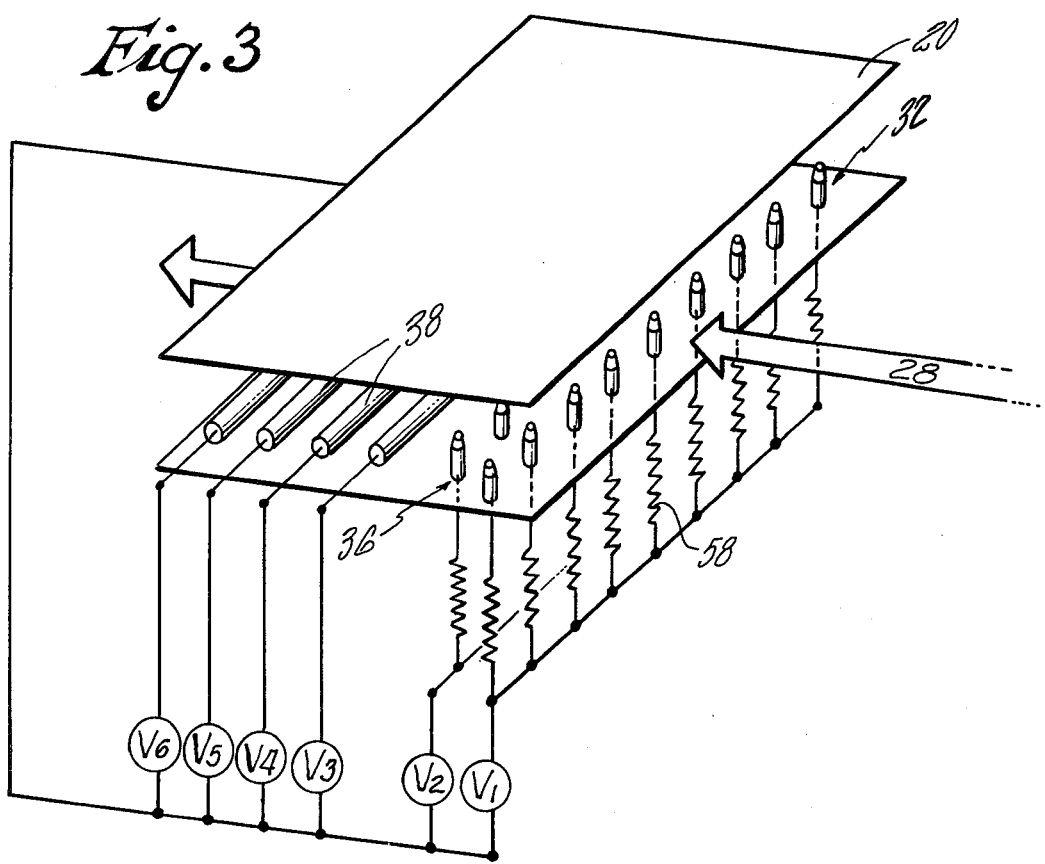
FIG. 3 is a simplified view of the electrical circuit for the electrode configuration of FIG. 1.

FIG. 2 shows a simplified view of the cathode holder 30 having rows 32, 36, of pins 34 and rods 38. Each row of pins begins and ends with the first and last pins located within the cathode holder 30 at a sufficient distance from ends 44 of the cathode holder to insure that a path of ionized gas from the first or last pin does not interact with a post 46 which secures the rods to the cathode holder. This positional relationship minimizes streamering, arcing or other plasma instabilities due to discharge interaction among cathode members. The staggered relationship of the individual pins in the first row with the individual pins in the second row also minimizes discharge interactions between pins to enhance the diffuse nature of the discharge produced by the pins. Bolt holes 48 are positioned along the perimeter 50 of the cathode holder for securing the holder to the end plates 40 as shown in FIG. 1. An "O" ring groove 52 located on the perimeter 50 is capable of accommodating a seal to provide a gas tight connection between the cathode holder and the end plate. The posts 46 located in sleeves 53 of insulating material, such as alumina, extend through the cathode holder within passages 54 and are attached to the rods at one end and at the other end to an electrical circuit as shown in FIG. 3 for providing electrical power. The pins 34 are also located in sleeves 53 of insulating material and extend through the cathode holder 30 within passages 54 into the gas path channel. The cathode holder is formed with electrical insulation material having a sufficient dielectric strength, such as aluminum oxide, to avoid electrical shorting between the cathode elements.

A layer of pyroceram material 56 is deposited on the electrical insulation material to provide thermal isolation between the cathode holder 30 and the electrical discharge. In the preferred embodiment the cathode elements are formed with refractory metals such as molybdenum or tungsten. The rods 38 and posts 46 may be solid or hollow to allow coolant to pass therethrough. The utilization of hollow rods minimizes rod distortions due to bending in the central portion thereof by the weight of the rod.

In the operation of the device, as shown in FIG. 1, a suitable lasing gas mixture such as carbon dioxide, nitrogen and helium, flows through the gas path channel 24 between the cathode and the anode with a pressure typically in excess of fifty torr and preferably in the range of several hundred torr. The diameters of the pins 34 are small, typically one to two millimeters, with the portion extending into the path of the gas having a reduced diameter at the tip 35 approximately a point. A low level weakly ionized discharge having a degree of ionization, i.e., ratio of electron density to neutral gas density, typically less than $10^{-5}$, is initiated by applying a suitable electrical potential between the anode 20 and the pin rows 32 and 36. By virtue of the geometry of the pins, the discharge is initiated and sustained in the high field region at the sharpened tip of these electrodes even in the presence of a high pressure high velocity transverse gas flow. Each of the pins 34 in rows 32 and 36 has an individual ballast resistor 58, as shown in FIG. 3, with typically a value of fifty thousand ohms, in electrical series with the sources of electrical power $V_1$ and $V_2$, to stabilize the current flowing through each pin into the discharge. This utilization of resistive ballasting for discharge stabilization is well known in the art and serves to insure uniformity of current flow from each pin in a given pin row.

The formation of the upstream preionization discharge has been found to favorably influence the discharge characteristics of the downstream rod electrodes 38. Specifically, by virtue of the presence of the upstream preionization discharge, a stable, uniform, high power density discharge can be produced and maintained between the rods 38 and the anode 20 without having to resort to the use of external resistive ballasting. The rods 38 provide an extended continuous cathode area resulting in a substantially uniform diffuse discharge between the cathode and anode.

The utilization of a plurality of rods transversely disposed to the path of the gas in a spaced apart relation to one another allows the power deposition into the gas to be controlled by the power sources $V_3$, $V_4$, $V_5$ and $V_6$, as shown in FIG. 3, to adjust the discharge conditions to optimize optical power extraction. With the configuration shown in FIG. 1, discharge power densities of 96.7 w/cm³ have been achieved in stable uniform discharges at pressures of 141 torr and flow velocities of 205 m/sec in a gas having a mixture of carbon dioxide, nitrogen and helium in the ratio of 1:7:12 by density. Stable discharge operation has also been achieved at pressure in excess of 200 torr. The configuration of the present invention has produced a closed cycle continuous wave laser having an optical output of twenty-five kilowatts at approximately a fifteen percent electrical efficiency with a direct current power source.

The ability to tailor the discharge conditions by controlling the power deposition into the gas from each rod 38, allows the optimization of the overall discharge efficiency, laser optical power output or overall laser efficiency. When operated for maximum discharge efficiency as much as seventy percent of the electrical power deposition into the gas stream is from the rods. When operated to optimize output power of the laser beam, this value typically is greater than sixty percent. Under either of the conditions, the lack of ballast resistance in the rod portion of the circuit favorably impacts overall system efficiency. Furthermore, a pressure drop of less than three percent was obtained in the discharge region. It must be noted that this performance can be achieved only in the presence of a highly uniform inlet flow field.

For proper operation of the preferred embodiment, the rods must be maintained in a parallel relationship to the anode to eliminate electrical field distortions which can give rise to discharge nonuniformities. Thus, bending of the rods in the central region must be minimized or eliminated. Additionally, the rods must extend into the gas stream a sufficient distance to ensure that the active electrical portion of the rod is outside of a gas flow boundary layer that normally develops along the walls of a flow channel. Maintaining the electrically active portion of the rod outside the boundary layer is a critical consideration for preventing discharge heating of the gases in the boundary layer having a characteristic low velocity which would directly lead to the discharge collapsing into an arc. The rods as shown in the Figs. have a cylindrical configuration preferably having a cross-sectional area sufficiently small to minimize perturbation to the flow. The rods typically have a diameter variable between one and one half to five millimeters. It is to be recognized that the rods can be aerodynamically shaped to minimize flow perturbations.

Referring now to FIG. 3, which shows a simplified schematic of the electrical circuit adapted for providing power to the electrode configuration. The anode 20 is typically maintained at a positive potential and each row of pins 32, 36, and each rod 38 has a separate source of electrical power $V_1$, $V_2$, $V_3$, $V_4$, $V_5$ and $V_6$ respectively, capable of initiating and sustaining a discharge within the gas. Sources of electrical power $V_3$, $V_4$, $V_5$ and $V_6$ are capable of being adjusted to control the power deposition into the gas per unit length in the flow direction to shape the discharge characteristics for optimization of the mode profile of the gain medium to obtain efficient optical power extraction.

Figure 4:
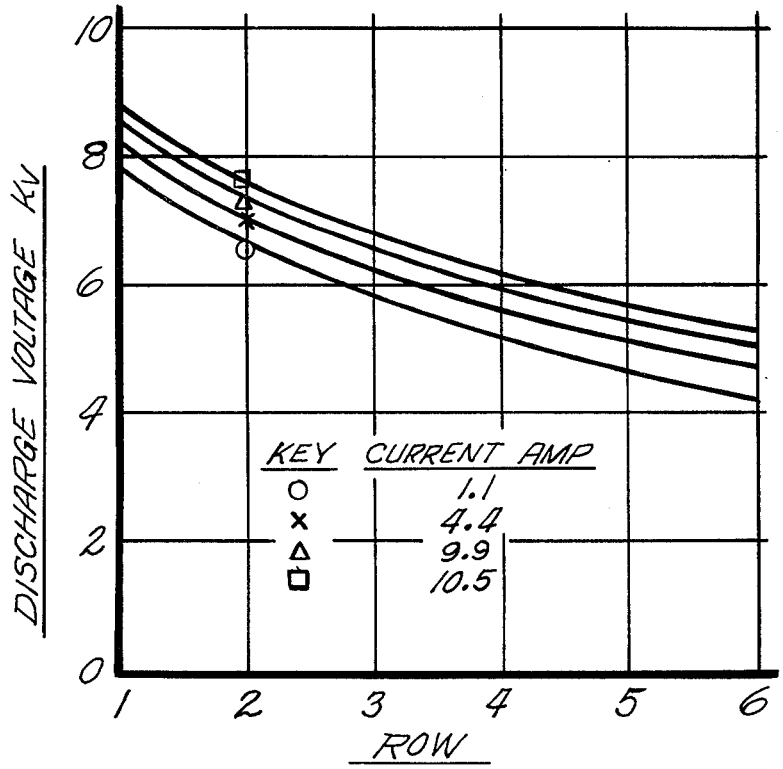
FIG. 4 shows the spatial voltage characteristics at different currents of an electrode configuration having a pin-rod cathode and a planar anode.

Appropriate electrical control components such as diodes, etc. may be incorporated with each power electrode to adjust the input power conditions to the electrode to match the discharge conditions as a function of position within the gas path channel. Additionally, the main parameters such as discharge current to the rods and pins, ballast resistance in the pin portion of the electrical circuit, gas velocity, pressure and gas mixture, cathode-anode spacing, spacing between rods, and the pin to rod spacing must all be optimized to produce an optimum optical flux within the optical cavity. The voltage applied to a given rod depends upon the spatial position relative to the upstream pins and follows the spatial trend shown in FIG. 4.

The electrical circuit as shown in FIG. 3 shows several sources of electrical potential supplying power to the pins and the rods. It is to be recognized that a first power supply may be connected to the rods while a second power supply is connected to the pins. Additionally, a single power supply may be utilized. Appropriate control elements, such as power diodes, may be required to adjust the electical power deposition into the gas by each pin and rod.

Although the invention has been shown and described with respect to a preferred embodiment thereof it should be understood by those skilled in the art that the foregoing and various other changes and omissions in the form and detail thereof may be made therein without departing from the spirit and scope of the invention.

Having thus described a typical embodiment of our invention, that which we claim as new and desire to secure by Letters Patent of the United States is:

1. An apparatus for the deposition of electrical power into a gaseous medium flowing through a discharge region comprising:
   an anode having a configuration of a plane and defining one side of a gas path through the discharge region;
   a cathode, disposed in a spaced apart substantially parallel relation to the anode and defining another side of the gas path through the discharge region, including at least one row of preionization electrodes extending into the discharge region for applying a first electric potential to ionize gas flowing past the preionization electrodes and at least one power electrode disposed downstream of and substantially parallel to the row of preionization electrodes, extending into the discharge region, having a substantially parallel relation to the anode for applying a second electric potential to generate a discharge, substantially diffuse and stable, between the cathode and the anode; and
   ballast means connected to the preionization electrodes for controlling electrical current passing from the preionization electrodes to the anode through the ionized gas.

2. The invention in accordance with claim 1 wherein the preionization electrode is a pin.

3. The invention in accordance with claim 2 wherein the portion of the pin extending into the discharge region terminates at a tip having a reduced diameter for providing a high electrical field concentration at the surface of the tip.

4. The invention in accordance with claim 1 wherein the power electrode is a rod having a longitudinal axis substantially parallel to the row of preionization electrodes.

5. The invention in accordance with claim 1 wherein the cathode has at least two rows of preionization electrodes with individual preionization electrodes in each row positioned in a staggered relationship with the individual preionization electrodes in an adjacent row.

6. The invention in accordance with claim 1 wherein the row of preionization electrodes and the power electrode are disposed substantially transverse to the gas path through the discharge region.

7. The invention in accordance with claim 1 wherein the ballast means includes a ballast resistor connected to each of the preionization electrodes.

8. The invention in accordance with claim 1 further including means for providing electrical power to the power electrodes and the preionization electrodes.

9. The invention in accordance with claim 4 wherein the rod has a tubular configuration capable of passing coolant to remove heat within the rod during operation.

10. The invention in accordance with claim 1 wherein the electrodes are made with refractory metals.

11. In a laser having an optical cavity, an electrode apparatus for the deposition of electrical power in a gas flowing through a discharge region comprising:
    an anode having a configuration of a plane and defining one side of a gas path through the discharge region;
    a cathode disposed in a spaced apart substantially parallel relation to the anode and defining another side of the gas path through the discharge region including at least one row of preionization electrodes extending into the discharge region for applying a first electric potential to ionize gas flowing past the preionization electrodes and a least one power electrode disposed downstream of and substantially parallel to the row of preionization electrodes and substantially transverse to the gas path, extending into the discharge region for applying a second electric potential to generate a discharge, substantially stable and diffuse, within the optical cavity between the anode and the cathode; and
    ballast means connected to the preionization electrodes for controlling electrical current passing from the preionization electrodes to the anode.

12. A method for deposition of electrical power into a gaseous medium flowing through a discharge region comprising:
    providing an anode having a configuration of a plane and defining one side of a gas path through the discharge region;
    providing a cathode disposed in a spaced apart substantially parallel relation to the anode and defining another side of the gas path, having at least one row of preionization electrodes and at least one power electrode having a longitudinal axis disposed downstream of and substantially parallel to the row of preionization electrodes;
    providing a flow of gas capable of being ionized between the anode and the cathode in a direction substantially transverse to the row of preionization electrodes;
    maintaining a first electric potential between the preionization electrodes and the anode to provide a weakly ionized gas;
    controlling the electrical current deposition into the gas by the preionization electrodes with a ballast resistor attached to each preionization electrode;
    generating a discharge, substantially diffuse and stable, within the gas with a second electric potential maintained between the power electrodes and the anode; and
    controlling the second electric potential between the power electrode and the anode to adjust the discharge characteristics within the gas wherein at least sixty percent of the electric power deposition into the gas passes through the power electrodes.

13. The method in accordance with claim 12 further including maintaining the flowing gas at a pressure of at least fifty torr within the discharge region.

14. The invention in accordance with claim 12 wherein the first electric potential provides a continuous direct current to the preionization electrodes from a first power supply and the second electric potential provides a continuous direct current to the power electrodes from a second power supply.

15. The invention in accordance with claim 12 wherein the gas capable of being ionized is a mixture of carbon dioxide, nitrogen and helium.

16. The invention in accordance with claim 12 further including means for providing electrical power to the power electrodes and the preionization electrodes.

17. A method for the deposition of electrical power into a gaseous medium flowing through a discharge region comprising:
    providing an anode having a configuration of a plane and defining one side of a gas path through the discharge region;
    providing a cathode disposed in a spaced apart substantially parallel relation to the anode, and defining another side of the gas path having at least one row of preionization electrodes and having at least one rod having a tubular construction with a longitudinal axis disposed downstream of and substantially parallel to the row of preionization electrodes and substantially parallel to the anode;

providing a flow of ionizable gas between the anode and the cathode in a direction substantially transverse to the row of preionization electrodes;

maintaining a first electric potential between the preionization electrodes and the anode to provide a weakly ionized gas flowing therethrough;

controlling the electrical current deposition into the gas by the preionization electrodes with a ballast resistor on each preionization electrode;

generating a discharge in the gas downstream the preionization electrodes with a second electric potential between the rods and the anode;

controlling the second electric potential between unballasted rods and the anode to match the discharge characteristics within the gas to maintain a discharge, substantially stable and diffuse, between the cathode and the anode; and passing a coolant through the rods having tubular construction to allow high current flow through the rods.

18. A method of obtaining a laser beam having high power from an electric discharge laser having a gaseous medium flowing through a discharge region comprising:

providing an anode having a configuration of a plane and defining one side of a gas path through the discharge region;

providing a cathode disposed in a spaced apart substantially parallel relation to the anode and defining another side of the gas path having at least one row of pins and at least one rod having a longitudinal axis disposed downstream of and substantially parallel to the row of pins and substantially parallel to the anode wherein said rod is unballasted;

providing a flow of ionizable gas between the anode and the cathode in a direction substantially transverse to the row of pins;

maintaining a first electric potential between each row of pins and the anode to provide a weakly ionized gas flowing therethrough;

controlling the electrical current deposition into the gas by the pins with a ballast resistor on each pin;

providing a second electric potential between each rod and the anode to obtain a stable and diffuse discharge in the gas downstream the pins;

controlling the second electric potential between the rods and the anode to match the discharge characteristics within the gas to obtain a substantially diffuse discharge between the cathode and the anode wherein at least sixty percent of the electrical power deposition into the gas is through the unballasted rods;

amplifying optical radiation within the diffuse discharge with an optical cavity defined at one end by a first mirror and at the other end by a second mirror and having an optical axis transverse to the gas path; and coupling an output beam from the optical cavity.

19. The method in accordance with claim 18 further including maintaining the flowing gas at a pressure of at least fifty torr within the discharge region.

20. The method in accordance with claim 19 wherein the gas is a mixture of carbon dioxide, nitrogen and helium.

21. The method in accordance with claim 18 wherein the first electric potential and the second electric potential are provided by power sources adapted for providing continuous direct current.

22. In a gas laser apparatus including a laser housing containing a flowing laser gas medium, the combination of, spaced apart cathode and anode electrodes defining a main laser discharge volume therebetween, said anode being a planar electrode, said cathode electrode comprised of rows of cathode elements including a combination of one or more rows each consisting of a plurality of discrete cathode pin elements being perpendicular to said planar anode electrode, and one or more rows, each consisting of a single elongated cathode element, all of said cathode elements being within said main laser discharge volume, DC excitation means, ballast means coupling said DC excitation means to said rows of cathode elements, and optical elements disposed relative to said discharge volume to define a laser optical cavity.

* * * * *

UNITED STATES PATENT AND TRADEMARK OFFICE
CERTIFICATE OF CORRECTION

PATENT NO. : 4,449,220
DATED : May 15, 1984
INVENTOR(S) : Peter P. Chenausky et al It is certified that error appears in the above-identified patent and that said Letters Patent is hereby corrected as shown below:

| | |
|---|---|
| Column 1, line 37 | "performances" should read --performance-- |
| Column 2, line 23 | "4,106,448" should read --4,016,448-- |
| Column 5, line 14 | "As" should read --At-- |
| Column 5, line 20 | "meals" should read --metals-- |
| Column 5, line 41 | "permit" should read --permits" |
| Column 6, line 16 | "having" should read --have-- |
| Column 6, line 21 | "rod" should read --row-- |
| Column 7, line 9 | "approximately" should read --approximating-- |
| Column 10, line 3 (Claim 11) | "a" should read --at-- |

Signed and Sealed this

Twenty-ninth Day of July 1986

[SEAL]

Attest:

DONALD J. QUIGG

Attesting Officer

Commissioner of Patents and Trademarks